Nov. 8, 1932.  D. D. RICHARDSON  1,887,139
FLOWER HOLDER
Filed June 25, 1930
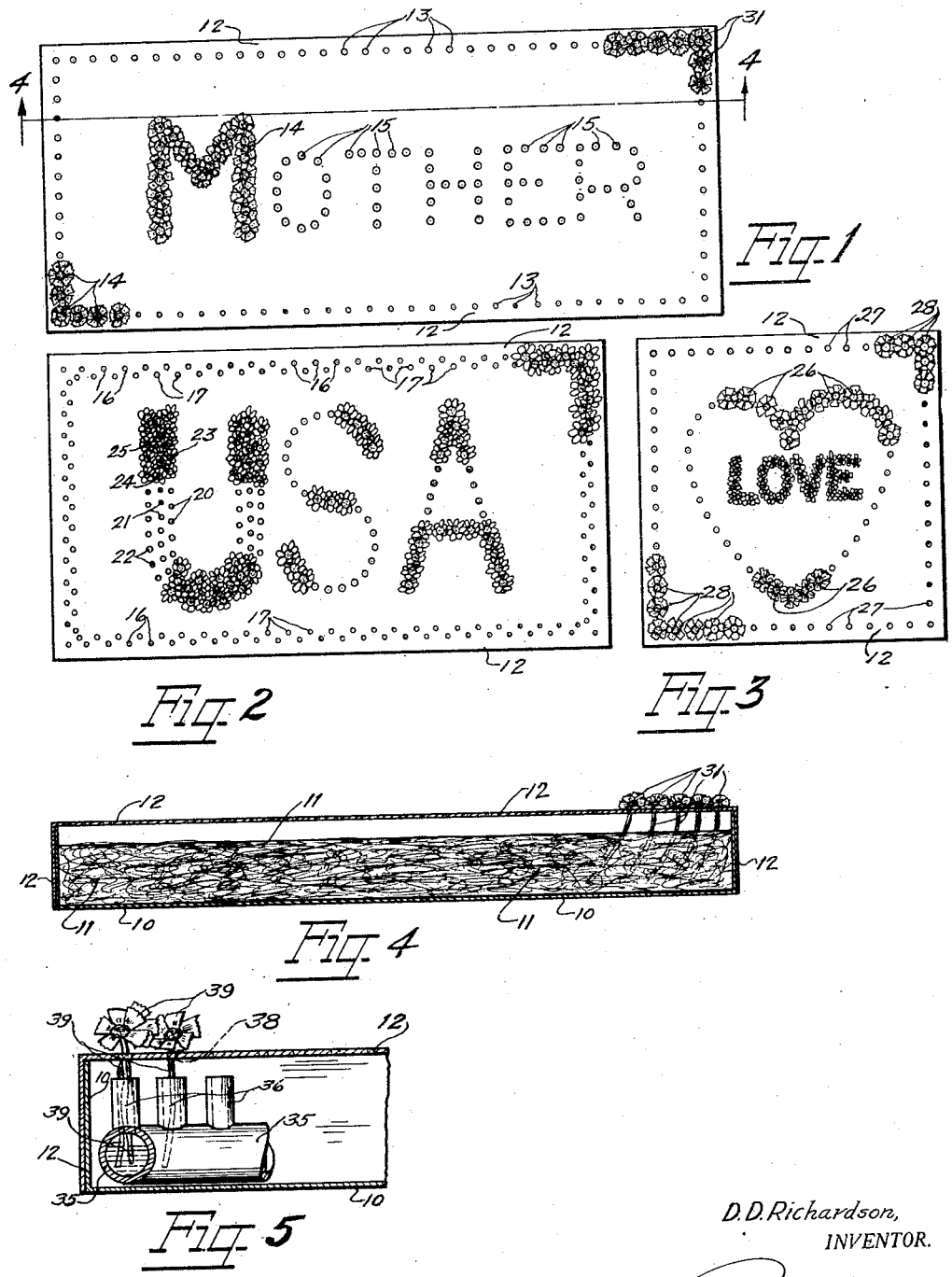
D. D. Richardson,
INVENTOR.
BY 
ATTORNEY.

Patented Nov. 8, 1932

1,887,139

UNITED STATES PATENT OFFICE

DWIGHT D. RICHARDSON, OF WEST END, NORTH CAROLINA

FLOWER HOLDER

Application filed June 25, 1930. Serial No. 463,589.

This invention relates to a flower holder and more especially to a flower holder having means therein for supporting flowers either artificial or natural flowers in such a manner as to form any desired design or characters such as letters.

An object of my invention is to provide the flower holder in box form with a portion of said box being perforated with holes to represent letters, characters, designs, ornamental features and any other design which may be required or desired, and in providing said box with means for sustaining the life of natural flowers by placing in said box moisture retaining means such as moss or if desired by placing within a container with openings therein adapted to coincide with the perforations in the box so that the flowers can be stuck through the perforations in the top of the box and project into the container in which water is held for supplying water to the plant and flowers to sustain life in the same.

Another object of my invention is to provide a flower holder or box suitable for holding either natural or artificial flowers and in which means for sustaining the moisture can be dispensed with and where artificial flowers are used the interior of the box can be used to place candy or any other suitable material therein, so that the box will serve a double purpose of being ornamental and also to contain goods, said box being adapted to be used after the goods are removed therefrom for holding flowers and for other ornamental purposes.

Some of the objects of my invention having been stated other objects will appear as the description proceeds, when taken in connection with the accompanying drawing, in which—

Figure 1 is a plan view of one form of my device;

Figure 2 is a plan view of another form of my device in which a plurality of rows for holding the flowers for the characters are shown;

Figure 3 is a plan view of another form of my device;

Figure 4 is a cross-sectional view taken along the line 4—4 in Figure 1;

Figure 5 is a modified form of my invention.

Referring more specifically to the drawing the numeral 10 indicates a box in which moss or any other absorbent material 11 is adapted to be placed and over this box a lid member 12 is adapted to fit, said lid member having a row of perforations indicated by the reference character 13 around the marginal portions thereof into which flowers 14 either artificial or natural may be placed to form an ornamental border for the same. In the central portion of the box as shown in Figure 1 I have indicated certain letters by making perforations and placing the flowers 14 in the first letter to indicate the appearance of said letters when they are formed from flowers or any other ornamental material. It is evident that instead of flowers 14 that any kind of foliage or any other ornamental material may be used instead of flowers.

The perforations in the central portion of Figure 1 are indicated by the reference character 15 there being one row of perforations for each letter.

In Figure 2 I have shown another form of my invention in which two rows 16 and 17 are shown around the marginal portion thereof and into which flowers or other ornamental members of various colors can be inserted. The letters formed in Figure 2 are made of three rows of perforations 20, 21 and 22, it being evident that the rows 20 and 22 may be of one color and the row 21 of a contrasting color or if desired all three rows can be filled with flowers or other ornamental members of the same color or all of different colors. In this form of the invention I show the flower or other ornamental members which are indicated by the reference characters 23, 24 and 25.

In Figure 3 I show the manner in which any kind of an ornamental design such as a heart indicated by the reference character 26 may be provided with the marginal edges punched with a plurality of holes 27 into which flowers or other ornamental members 28 may be inserted. All of these three structures shown in Figures 1, 2 and 3 may be ordinary boxes into which goods may be placed such as candy or if desired they can be used with the life sustaining moss or other absorbent material 11 and can be used only for the holding of live flowers or other vegetation for ornamental purposes. It is evident that these views shown in Figures 1, 2 and 3 can have many other perforations therein to completely cover the same if desired so that the same can be used as a holder for flowers for placing on graves and the like and for purely ornamental purposes.

In Figure 4 I show the flowers 31 which are the marginal flowers in Figure 1 of the drawing which are placed in the holes 13.

In Figure 5 I show a modified form of my invention in which the box 10 has the lid 12 with perforations therein and instead of having the moss 11 therein I can provide a pipe 35 with the upwardly projecting portions 36 adapted to approximately coincide with the punched out holes 38 into which flowers or other ornamental vegetation 39 may be placed. The stem of these flowers or other ornamental members 39 project into the member 35 into which water can be placed.

In the drawing and specification I have set forth a preferred embodiment of my invention, and although specific terms are employed, they are used in a generic and descriptive sense only, and not for purposes of limitation, the scope of the invention being set forth in the appended claims.

I claim:

1. A flower holder comprising a box member, a lid member for said box member of sheet material, a moisture retaining structure in said box member, perforations in said box member for the reception of flowers, vegetation and the like, said perforations being in a form to indicate a letter of the alphabet.

2. A flower holder comprising a box member, a lid of sheet material for said box member, marginal perforations in said lid portion, perforations in the central portion of said lid portion forming a design, all of said perforations being adapted to receive ornamental members for forming a design.

3. A flower holder comprising a box member, a lid for said box member and having perforations therein for the reception of flower stems, a container disposed in the box member, said container having perforations in the upper surface thereof coinciding with the perforations in the lid.

In testimony whereof I affix my signature.

DWIGHT D. RICHARDSON.